(12) United States Patent
Peuker et al.

(10) Patent No.: US 11,506,544 B2
(45) Date of Patent: Nov. 22, 2022

(54) MONITORING THE STATE OF A TEMPERATURE SENSOR

(71) Applicant: Endress+Hauser Wetzer GmbH+Co. KG, Nesselwang (DE)

(72) Inventors: Christian Peuker, Nesselwang (DE); Michael Korn, Marktoberdorf (DE); Pavo Vrdoljak, Nesselwang (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 163 days.

(21) Appl. No.: 16/954,184

(22) PCT Filed: Nov. 14, 2018

(86) PCT No.: PCT/EP2018/081153
§ 371 (c)(1),
(2) Date: Jun. 15, 2020

(87) PCT Pub. No.: WO2019/115118
PCT Pub. Date: Jun. 20, 2019

(65) Prior Publication Data
US 2021/0156748 A1  May 27, 2021

(30) Foreign Application Priority Data
Dec. 15, 2017  (DE) .............. 10 2017 130 135.6

(51) Int. Cl.
*G01K 7/18* (2006.01)
*G01K 7/16* (2006.01)
*G01K 15/00* (2006.01)

(52) U.S. Cl.
CPC .............. *G01K 7/18* (2013.01); *G01K 7/16* (2013.01); *G01K 15/00* (2013.01)

(58) Field of Classification Search
CPC .............. G01K 7/18; G01K 7/16; G01K 15/00
See application file for complete search history.

(56) References Cited

U.S. PATENT DOCUMENTS 5,050,430 A * 9/1991 Begin .................... G01F 23/72
324/207.13
5,700,090 A * 12/1997 Eryurek ................ G01K 15/00
374/E7.018

(Continued)

FOREIGN PATENT DOCUMENTS

| CN | 101592527 A | 12/2009 |
|----|-------------|---------|
| CN | 101988854 A | 3/2011 |

(Continued)

*Primary Examiner* — Nathaniel T Woodward
*Assistant Examiner* — Philip L Cotey
(74) *Attorney, Agent, or Firm* — Mark A. Logan; Endress+Hauser (USA) Holding Inc.

(57) ABSTRACT

Disclosed is an apparatus for determining the temperature, comprising a first temperature sensor, a second temperature sensor, and electronics which are configured to apply an electrical signal to the first temperature sensor and/or the second temperature sensor and to tap off at least one reception signal from the first temperature sensor and/or the second temperature sensor. The apparatus also comprises at least six connection lines for making electrical contact with the first temperature sensor and the second temperature sensor, wherein the connection lines are arranged and configured such that the first temperature sensor and the second temperature sensor are connected in series and can have the transmission signal applied thereto such that the first reception signal can be tapped off from the first temperature sensor and/or the second reception signal can be tapped off from the second temperature sensor.

10 Claims, 6 Drawing Sheets

(56) References Cited

U.S. PATENT DOCUMENTS

| | | | | |
|---|---|---|---|---|
| 5,711,607 | A * | 1/1998 | Bernstein | B01J 19/0046 374/179 |
| 6,924,649 | B2 * | 8/2005 | Knoedgen | G01D 5/165 702/133 |
| 6,974,934 | B2 * | 12/2005 | Sprock | G01K 1/024 374/E1.004 |
| 8,267,578 | B2 * | 9/2012 | Kamata | H03B 5/04 374/185 |
| 9,134,184 | B2 * | 9/2015 | Kamata | H03B 5/04 |
| 2010/0001785 | A1 * | 1/2010 | Baginski | H01L 23/34 257/E21.531 |
| 2010/0198546 | A1 * | 8/2010 | Kamata | H03B 5/04 374/143 |
| 2011/0299562 | A1 * | 12/2011 | Hashemian | G01K 7/02 374/182 |
| 2012/0294327 | A1 * | 11/2012 | Kamata | H03B 5/04 374/1 |
| 2016/0131538 | A1 * | 5/2016 | Kobayashi | G01K 7/01 374/183 |

FOREIGN PATENT DOCUMENTS

| | | |
|---|---|---|
| CN | 104620087 A | 5/2015 |
| CN | 205843836 U | 12/2016 |
| CN | 206281586 U1 | 6/2017 |
| DE | 3022942 A1 | 12/1981 |
| DE | 3330915 C2 | 3/1985 |
| DE | 102011084320 A1 | 4/2013 |
| DE | 102012107090 A1 | 2/2014 |
| EP | 0187317 A1 | 7/1986 |
| EP | 1579541 B1 | 6/2009 |
| EP | 2261624 A1 | 12/2010 |
| WO | 9105229 A1 | 4/1991 |

\* cited by examiner

MONITORING THE STATE OF A TEMPERATURE SENSOR

CROSS-REFERENCE TO RELATED APPLICATIONS

The present application is related to and claims the priority benefit of German Patent Application No. 10 2017 130 135.6, filed on Dec. 15, 2017 and International Patent Application No. PCT/EP2018/081153, filed on Nov. 14, 2018, the entire contents of which are incorporated herein by reference.

TECHNICAL FIELD

The invention relates to an apparatus for determining and/or monitoring the temperature of a medium, having two sensor elements and electronics. The medium is located in a receptacle, for example a container or a pipeline, and the apparatus can be, for example, introduced into the receptacle or attached to the receptacle.

BACKGROUND

Thermometers are known from the prior art in a great variety of embodiments. There are thermometers which use the expansion of a liquid, a gas or a solid with a known coefficient of expansion to measure the temperature, or others which relate the electrical conductivity of a material to the temperature by using, for example, resistance elements or thermocouples. In pyrometers, in contrast, the temperature of a substance is determined using its thermal radiation. The underlying measurement techniques in each case have been described in a plurality of publications.

Thermometers with resistance elements frequently comprise so-called thin-film sensor elements, or resistance temperature detectors (RTD). Usually, such a sensor element has a carrier substrate provided with connection wires and a metal-coated front surface. The rear side may also have a metal coating. For example, platinum elements which are commercially available under the designations PT10, PT100, and PT1000 are used as sensor elements.

In many cases, the sensor elements are encapsulated or embedded, preferably in pure ceramic powders, and the connection lines are guided in a guide tube to electronics, for example a temperature transmitter.

Various measuring principles for determining the temperature by means of a resistance element are known from the prior art. Details on industrial platinum resistance thermometers can be found, for example, in European standard EN60751. A transmission signal, usually in the form of an electrical current, is applied to the sensor element and a reception signal, usually in the form of a voltage drop across the sensor element, is detected and evaluated with regard to the temperature. In the simplest case, the temperature is determined by means of a temperature-dependent resistor using the so-called two-wire measurement technique, in which the sensor element is contacted via two connection wires. A disadvantage of this solution is that the resistance of the connection wires enters the temperature determination as an error. In the three-wire measurement technique, the sensor element is contacted via three connection wires. The resistance of the connection wires or lines can be largely compensated for by pairwise tapping off of the voltage drop between each two of the three connection wires, provided that it can be assumed that the line resistances of the three connection wires are the same.

The highest measurement accuracy can be achieved by means of the so-called four-wire measurement technique. The sensor element is contacted via four connection wires, wherein the transmission signal is applied to the sensor element via a first pair of connection wires, and wherein the reception signal is received via a second pair of connection wires. When using the four-wire measurement technique, any potential asymmetries in the line resistances of the various connection wires can also be compensated for.

Redundant design of a thermometer is known from the prior art to increase reliability and/or measurement accuracy. One possibility is that a plurality of thermometers can be used simultaneously. However, thermometers with at least two temperature sensors, which can be arranged, for example, in a single sensor head or measuring insert, are also known. If one of the two temperature sensors fails, the temperature can still be determined by means of the same thermometer via the second temperature sensor. Such thermometers are referred to as, for example, "double pt100" or "double pt1000," depending on the type of sensor elements used.

In thermometers with a plurality of temperature sensors, especially, in the form of resistance elements, it may be problematic that each individual temperature sensor must be contacted separately by means of connection lines. As the number of temperature sensors in a thermometer increases, the number of required connection lines increases accordingly, with both the size of the thermometer and the complexity of the electronics increasing.

The number of connection lines to be guided also increases to different extents depending on the measurement technique used. Given the usual dimensions of industrial thermometer measuring inserts, especially, the dimensions of the guide tubes for guiding the connection lines to the electronics, the four-wire measurement technique can only be realized with great difficulty even when there are only two temperature sensors in one measuring insert since eight connection lines must already be guided to the electronics in this case. Electrical insulation must be provided between the various connection wires and from the guide tube over the entire distance from each temperature sensor to the electronics.

In order to be able to achieve a good compromise between typical requirements for the dimensions of the respective thermometer and the attainable measurement accuracy, thermometers with at least two temperature sensors are usually designed according to the three-wire measurement technique. In this case, for a thermometer with two temperature sensors, for example, six connection lines must be guided to the respective electronics. In order to reduce the size of an arrangement with two temperature sensors, it is alternatively known from DE102011084320A1 to apply a high-frequency electrical signal to each sensor element with a predetermined frequency for the particular sensor element. An impedance which is a function of the temperature can then be determined from the reflected measurement signal. In this way, two measurement elements with a single pair of connection lines can be used. However, such electronics are comparatively elaborate and complex.

SUMMARY

The object of the invention is to disclose a possibility for increasing the measurement accuracy of a thermometer having at least two temperature sensors and the most compact design possible in the simplest manner possible.

This object is achieved by an apparatus for determining and/or monitoring the temperature, comprising a first temperature sensor, a second temperature sensor, and electronics. The electronics are configured to apply at least one electrical transmission signal in the form of an electrical current to the first and/or the second temperature sensor and to tap off at least one first and/or second electrical reception signal in the form of an electrical voltage from the first and/or second temperature sensor. The apparatus according to the invention also comprises at least six connection lines for making contact, especially, electrical contact, with the first and second temperature sensors, wherein the connection lines are arranged and configured in such a manner that the first and second temperature sensors are connected in series and can have the transmission signal applied thereto and that the first reception signal can be tapped off from the first temperature sensor and/or the second reception signal can be tapped off from the second temperature sensor.

At least one temperature sensor, especially, both temperature sensors, are preferably resistance elements, for example platinum elements. The electronics are again a temperature transmitter, for example.

The thermometer according to the invention can serve, for example, as a temperature measuring insert, wherein the connection lines are guided in a guide tube which can in turn be brought into direct contact with the respective medium. The guide tube can be at least partially filled with an insulating material, for example a ceramic powder.

However, it is also possible to additionally provide a protective tube which can be brought into contact with the medium and in which protective tube at least the two temperature sensors and also at least part of the connection wires are arranged.

The apparatus according to the invention enables a space-saving, compact design by reducing the number of connection lines guided to the electronics. The two temperature sensors are connected by means of at least one of the at least six connection lines so that, of the at least six connection lines, only at least five connection lines are guided to the electronics. Because of the series connection of the two temperature sensors and because a reception signal can be tapped off individually from each temperature sensor, a high measurement accuracy can be achieved in a simple manner using the apparatus according to the invention despite its compact design. At the same time, the reliability of the apparatus can be ensured. If one of the two temperature sensors fails, the temperature can continue to be determined and/or monitored by the other functional temperature sensor using the three-wire measurement technique.

It is advantageous if a first connection line runs from the electronics to the first temperature sensor, a second connection line from the first to the second temperature sensor, and a third connection line from the second temperature sensor to the electronics. In this way, series connection of the two temperature sensors can be realized in a simple manner.

It is also advantageous if a fourth connection line runs from the first temperature sensor to the electronics and a fifth connection line runs from the second temperature sensor to the electronics.

It is also advantageous if a sixth connection line connects the electronics to the second connection line.

In this embodiment, the two temperature sensors can advantageously be operated according to the four-wire measurement technique, even though only five connection lines are routed to the electronics. In the event of failure of one of the two temperature sensors, the remaining functioning temperature sensor can still be operated according to the three-wire measurement technique. For example, a first reception signal can be tapped off from the first temperature sensor between the fourth and sixth connection lines and a second reception signal can be tapped off from the second temperature sensor between the fifth and sixth connection lines.

A preferred embodiment of the apparatus according to the invention includes the electronics having a first voltage determination unit for tapping off the first reception signal from the first temperature sensor and a second voltage determination unit for tapping off the second reception signal from the second temperature sensor.

In this case, it is advantageous if the first voltage determination unit is configured to tap off the first reception signal between the fourth and sixth connection lines, wherein the second voltage determination unit is configured to tap off the second reception signal between the fifth and sixth connection lines.

A preferred embodiment of the apparatus according to the invention includes the electronics having a single current generation unit for generating the transmission signal and at least one switching element.

In a first switch position of the switching element, for example, the transmission signal can then be applied to the first temperature sensor, while in a second switch position of the switching element, the transmission signal can be applied to the second temperature sensor. Furthermore, a third switch position of the switching element is preferably provided in which the transmission signal can be applied to both temperature sensors.

Both a single switching element with at least two, preferably three switch positions, and at least two switching elements each with at least two switch positions are conceivable within the scope of the present invention.

It is advantageous if the at least one switching element is arranged and configured in such a way that an electrical connection can be established between the first and sixth connection lines and/or between the third and sixth connection lines by means of the switching element.

The electronics can, for example, be configured in such a way that it can detect on the basis of the reception signal received in each of the different switch positions whether one of the two temperature sensors is defective. The electronics and/or the at least one switching element can also be configured in such a way that the switching element can be activated by means of the electronics, i.e., that the various switch positions can be adjusted by means of the electronics.

In the event of a failure of one of the two temperature sensors, determining and/or monitoring of the temperature can be continued with the respectively functional sensor by suitable activation of the switching element. In this case, it can be ensured that the temperature can at least be found according to the three-wire measurement technique. A defect in the respectively activated temperature sensor can be inferred, for example, if a reception signal is no longer received in one of the switch positions.

In an alternative preferred embodiment of the apparatus according to the invention, the electronics have a first and a second current generation unit. Both current generation units are used to generate the at least one transmission signal.

In this case, it is advantageous if the first and second current generation units are connected in series and connected to one another by means of a seventh connection line.

It is also advantageous if the sixth connection line connects the second and seventh connection lines to one another. In this case, the two current generation units are located on opposite sides of the junction of the sixth and seventh connection lines.

In the event that both temperature sensors are functional, the sixth connection line in this embodiment advantageously remains currentless if substantially the same current is respectively generated by means of the two current generation units.

In one embodiment of the apparatus according to the invention, the first current generation unit and the first voltage determination unit are arranged in a first electronics unit, wherein the second current generation unit and the second voltage determination unit are arranged in a second electronics unit.

In an alternative embodiment of the apparatus according to the invention, the first and second current generation units and the first and second voltage determination units are arranged together in the same electronics.

In a particularly preferred embodiment, the apparatus according to the invention comprises an eighth connection line, which eighth connection line runs from the second connection line to the electronics. In this embodiment, a total of at least six connection lines are guided to the electronics. However, for an embodiment with an eighth connection line, it can advantageously be ensured that, in the event of the failure of one of the two temperature sensors, the apparatus can always be operated according to the four-wire measurement technique, leading to a further increase in the attainable measurement accuracy of the apparatus. This also applies in the event of failure of one of the two temperature sensors.

For this embodiment, it is advantageous if the first voltage determination unit is configured to tap off the first reception signal between the fourth and eighth connection lines, wherein the second voltage determination unit is configured to tap off the second reception signal between the fifth and eighth connection lines. In the event that both temperature sensors are functional, the seventh connection line remains currentless as in the previously described exemplary embodiments.

BRIEF DESCRIPTION OF THE DRAWINGS

The invention is explained in more detail with reference to the following figures. The figures show.

In the description below, identical elements are provided with the same reference characters.

DETAILED DESCRIPTION

Figure 1A:
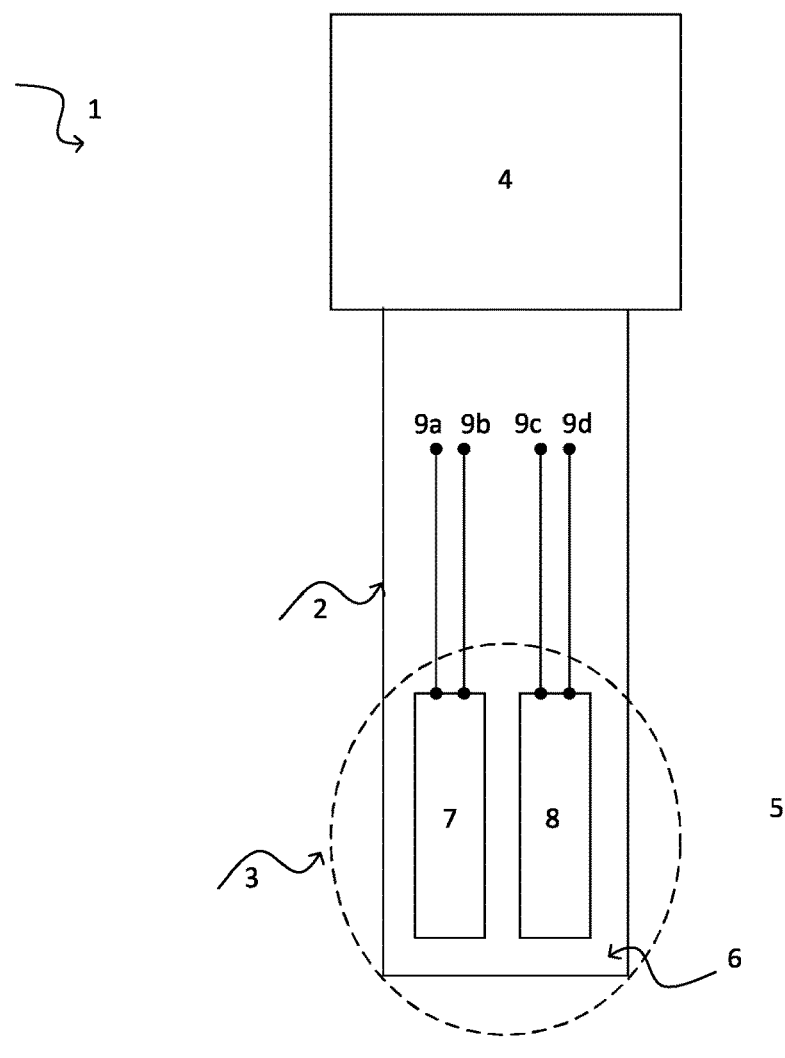
FIG. 1 shows a schematic drawing of a thermometer according to the prior art, having two temperature sensors according to (a) the two-wire measurement technique, (b) the three-wire measurement technique and (c) the four-wire measurement technique.

FIG. 1 shows various schematic depictions of a thermometer 1 according to the prior art. FIG. 1a shows a thermometer 1 having a protective tube 2 and electronics 4, especially, a temperature transmitter. The partial region of the protective tube 2 facing the medium 5 in each case is also referred to as the sensor head 3. The internal volume of the sensor head 3 is filled with a filler, especially, an electrically insulating filler 6, especially, a cement.

Furthermore, a first temperature sensor 7 and a second temperature sensor 8 are arranged in the interior of the sensor head 3 and each are electrically contacted via two connection wires 9a, 9b and 9c, 9d, respectively, which are guided to the electronics 4. Other embodiments may comprise, for example, a guide tube for guiding the connection wires 9a-9d. The temperature sensors 7 and 8 are, for example, resistance elements, especially, structurally identical ones.

Figure 1B:
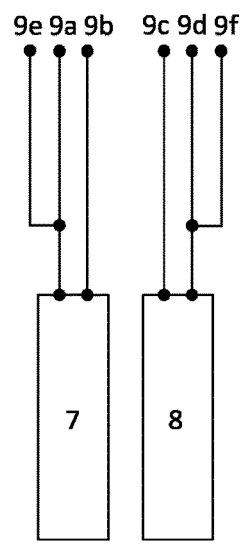
Figure 1C:
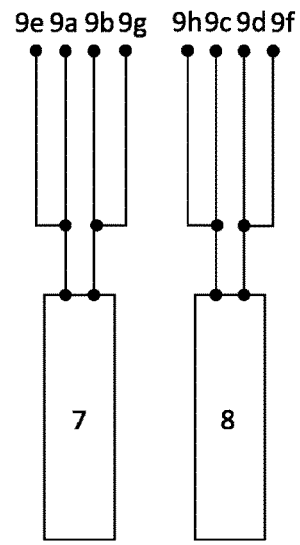

The thermometer shown in FIG. 1a is operated according to the two-wire measurement technique, which has already been mentioned in the introduction of the description and is well known from the prior art. In order to compensate for the influence of the, especially, ohmic, line resistances of the connection lines 9a-9d, however, the use of the three-wire or four-wire measurement technique, as illustrated in FIGS. 1b and 1c, is recommended. If the three-wire measurement technique as illustrated in FIG. 1b is used, if the thermometer 1 has two temperature sensors 7 and 8, six connection lines are already needed; if the four-wire measurement technique as illustrated in FIG. 1c is used, eight connection lines are even required. This places high demands on the geometric design of the thermometer. For example, it must be ensured that the connection wires 9a-9f are always electrically insulated from one another and from the guide tube. In addition, commercially available protective tubes and/or guide tubes usually only have diameters of up to 3 mm.

The present invention addresses this problem by providing a thermometer which has at least two temperature sensors and the most compact design possible and can simultaneously achieve a high measurement accuracy. Especially, the influence of the line resistances of the connection lines on the temperature determination and/or monitoring can be taken into account or compensated for.

According to the invention, as still to be explained in detail with reference to FIGS. 2-5, the number of connection lines 19 guided to the electronics 14 is reduced while simultaneously ensuring a high measurement accuracy. To this end, the two temperature sensors 17, 18 are connected in series. It is nevertheless ensured that a reception signal can be tapped off individually from each temperature sensor 17, 18. As a result, each of the two temperature sensors 17, 18 can be operated individually, especially, in the event of a failure of one of the two temperature sensors 17, 18.

Figure 2:
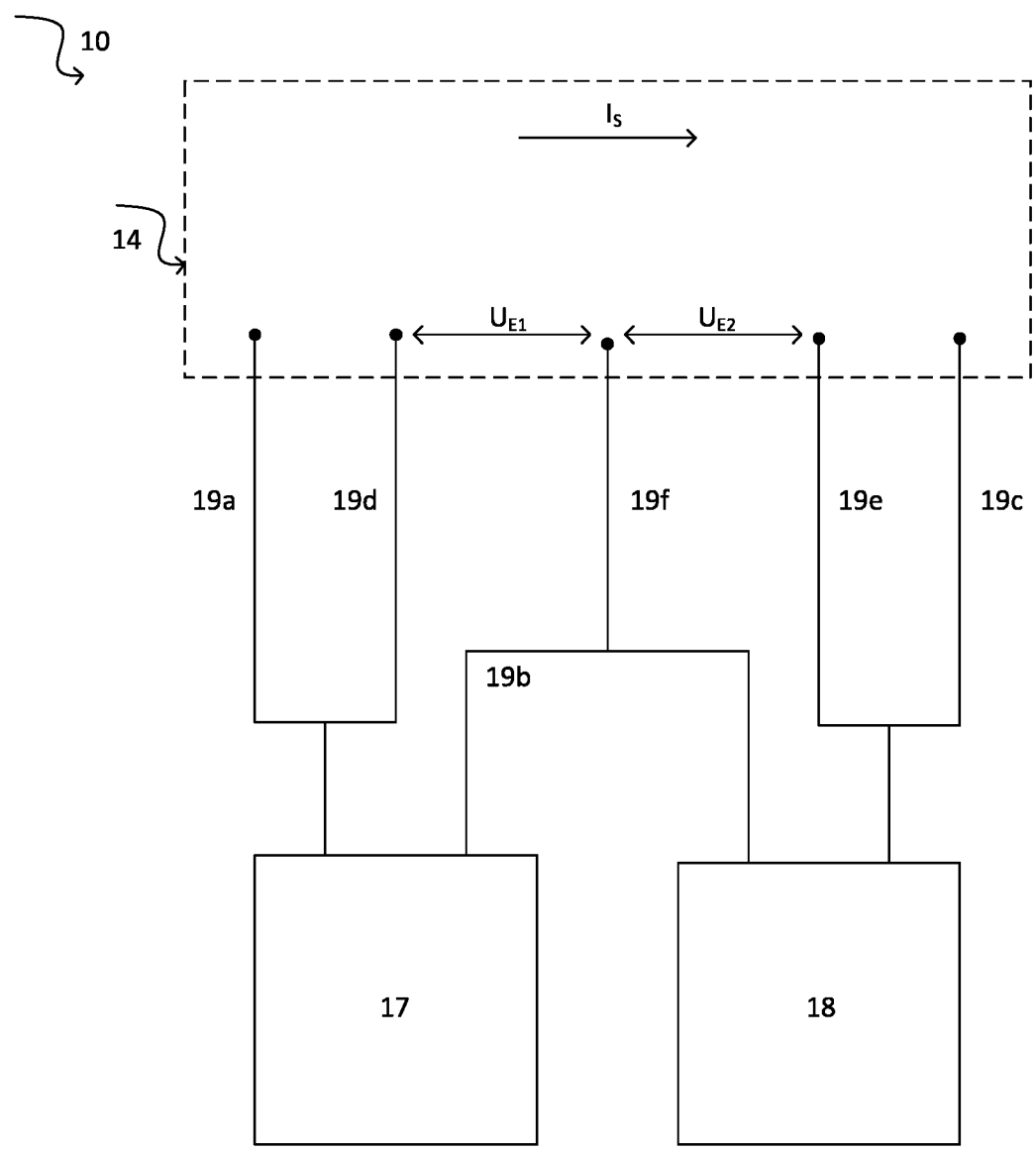
FIG. 2 shows a schematic drawing of the thermometer according to the present disclosure, having five connection lines guided to the electronics.

FIG. 2 shows a first possible design of an embodiment according to the invention. A first connection line 19a runs from the electronics 14 to the first temperature sensor 17, a second connection line 19b from the first temperature sensor 17 to the second temperature sensor 18 and a third connection line 19c from the second temperature sensor 18 back to the electronics 14. In this way, a series connection of the two temperature sensors 17, 18 is realized by means of the three connection lines 19a-19c. The electronics 14 are designed to generate a transmission signal $I_S$ which can be applied to the two temperature sensors 17, 18. For this purpose, it has, for example, at least one current generation unit [not shown in FIG. 2].

In addition, a fourth connection line 19d runs from the first temperature sensor 17 to the electronics 14, a fifth connection line 19e from the second temperature sensor 18 to the electronics 14 and a sixth connection line 19f from the second connection line 19b to the electronics 14. The electronics 14 are in turn configured to tap off a first reception signal $U_{E1}$ between the fourth connection line 19d and sixth connection line 19f and a second reception signal $U_{E2}$ between the sixth connection line 19f and the fifth connection line 19e. For example, the electronics 14 have at least one voltage determination unit [not shown in FIG. 2] for this purpose.

If one of the two temperature sensors 17 or 18 fails, the thermometer 1 can still determine and/or monitor the temperature via the respectively remaining functional temperature sensor 17 or 18. The thermometer according to the invention is therefore fail-safe. At the same time, it is ensured in any case that at least the three-wire measurement technique is used for determination and/or monitoring so that in any case the potential influence of the line resistances of the connection lines 19a-19f is taken into account. At the same time, compared to apparatuses known from the prior art, only five connection lines 19a and 19c-19f are guided to the electronics 14 according to the invention as per the embodiment in FIG. 2.

Figure 3:
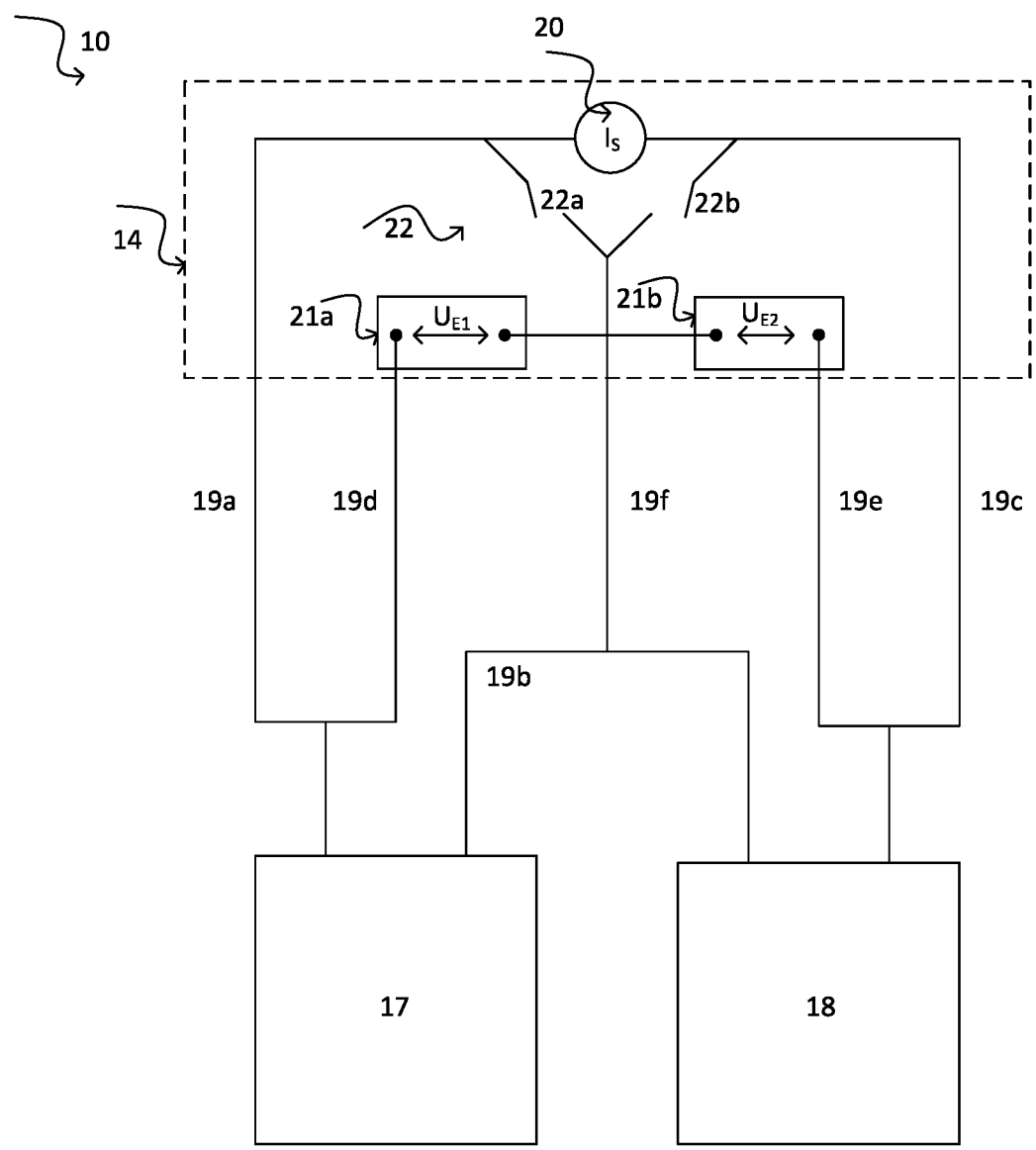
FIG. 3 shows a schematic drawing of the thermometer according to the present disclosure, having five connection lines guided to the electronics and a single current generation unit.

Another embodiment of the present invention is shown in FIG. 3. Reference characters explained in connection with FIG. 2 are not discussed again here. The electronics 14 have a current generation unit 20 for generating a transmission signal $I_S$, as well as a first voltage determination unit 21a for tapping off the first reception signal $U_{E1}$ from the first temperature sensor 17 and a second voltage determination unit 21b for tapping off the second reception signal $U_{E2}$ from the second temperature sensor 18.

The electronics 14 furthermore comprise a switching element 22 having a first switch 22a and a second switch 22b. The electronics 14 can also alternatively have a single switching element 22 or at least two switching elements 22. The switching element 22 has at least two switch positions. In FIG. 2, an electrical connection can be established or broken between the first connection line 19a and the sixth connection line 19f by means of the first switch 22a based on its current switch position. Analogously, an electrical connection can be established or broken between the third connection line 19c and the sixth connection line 19f by means of the second switch 22b based on its current switch position.

The electronics 14 are preferably configured to be able to detect, based on the reception signals $U_{E1}$ and $U_{E2}$ received in each of the different switch positions of the two switches 22a and 22b, whether one of the two temperature sensors 17, 18 is defective. The electronics 14 and/or the two switches 22a, 22b can also be designed in such a way that the switches 22a and 22b can be activated by means of the electronics 14, i.e., that the switch positions (here: open or closed) of the two switches 22a, 22b can be adjusted by means of the electronics 14. In the arrangement shown in FIG. 3, it can be ensured that even if there is a defect at one of the two temperature sensors 17 or 18, the temperature of the medium can be determined and/or monitored according to at least the three-wire measurement technique. For example, the two switches can be closed at pre-specifiable points in time, regularly, or if necessary, alternately, in order to check whether one of the two temperature sensors 17 or 18 has failed. If, for example, the reception signal $U_{E1}$ or $U_{E2}$ can no longer be tapped off from the respective temperature sensor 17 or 18 being checked, it can be inferred that the respective temperature sensor 17 or 18 has failed. However, a failure can also be detected in many other ways. For example, reception signals $U_{E1}$ or $U_{E2}$ measured at different times while the respective switch 22a or 22b is closed can be compared with each other. In this case, a defect in one of the two temperature sensors 17 or 18 can be inferred if there is a deviation above a pre-specifiable threshold value. Worsening of the measurement accuracy of the two temperature sensors 17 or 18 can also be detected in this way.

Figure 4A:
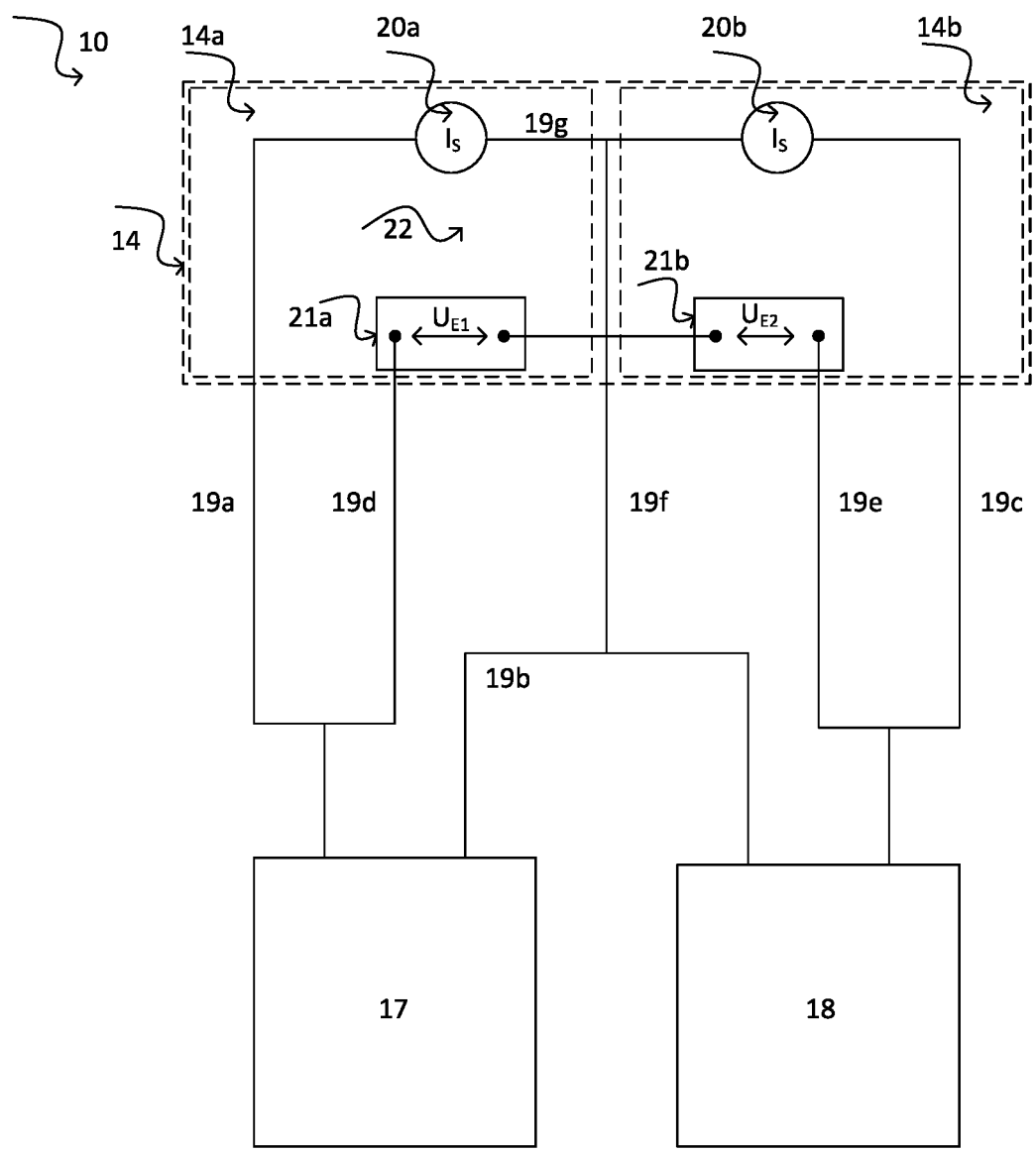
FIG. 4 shows a schematic drawing of the thermometer according to the present disclosure, having five connection lines guided to the electronics and two current generation units, which (a) are arranged in common electronics and (b) are arranged in two electronics units.
Figure 4B:
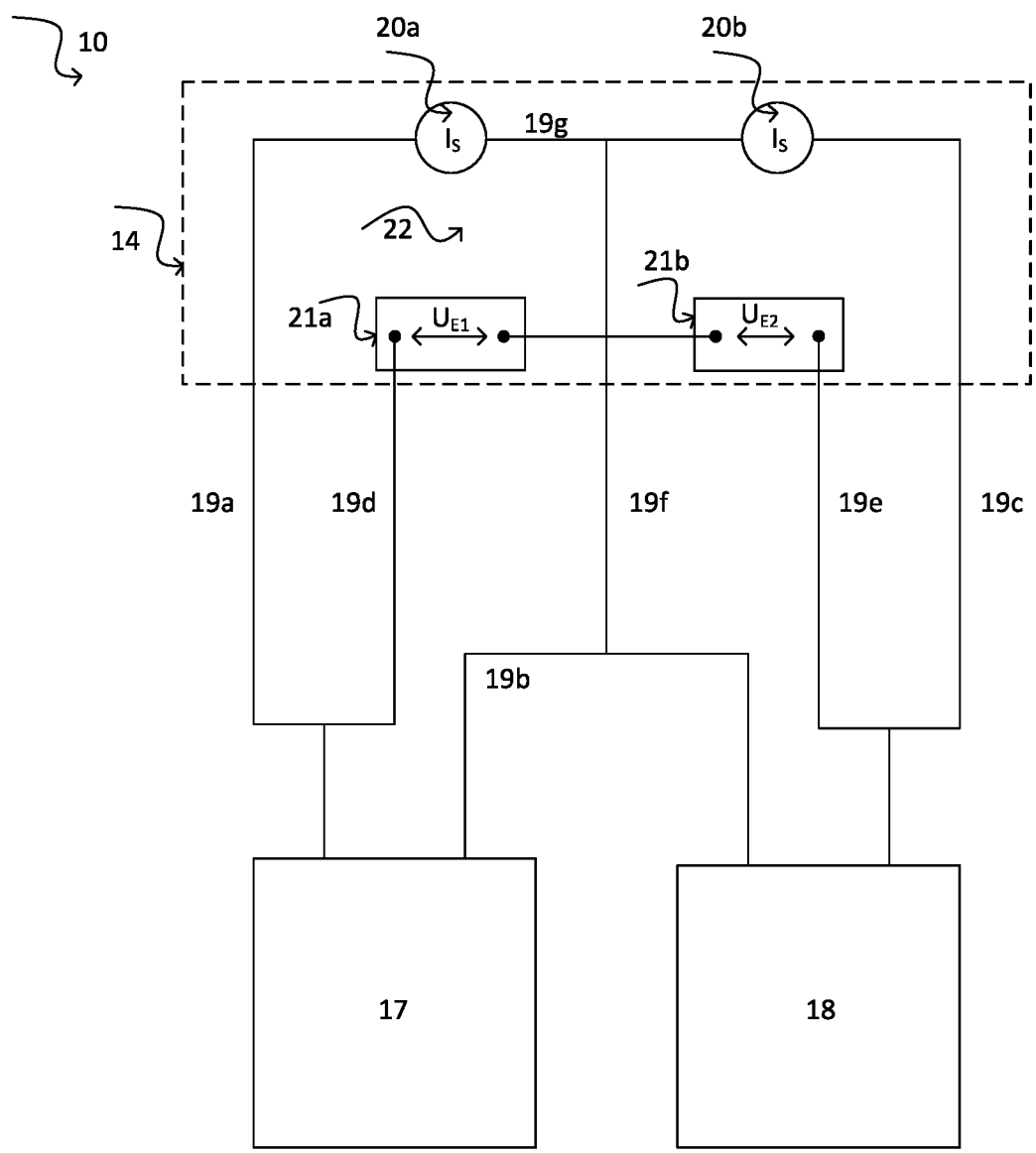

An alternative embodiment of the electronics 14 is shown in FIG. 4. The electronics 14 include two current generation units 20a and 20b which are electrically connected in series and are connected to one another by means of a seventh connection line 19g. In this case, the sixth connection line 19f runs between the second connection line 19b and the seventh connection line 19g, with the two current generation units 20a and 20b being located on opposite sides of the junction between the sixth connection line 19f and seventh connection line 19g. On the one hand, the electronics 14 may include two units 14a and 14b, each having a current generation unit 20a and 20b and a voltage determination unit 21a and 21b, respectively, as shown in FIG. 4a. However, it is also conceivable for both current generation units 20a and 20b and both voltage determination units 21a and 21b to be arranged in a single or the same electronics 14 as shown in FIG. 4b. Reference characters already explained in connection with other figures are not discussed again in detail within the scope of the explanation for FIG. 4.

In both variations shown in FIG. 4, the two current generation units 20a and 20b and the two temperature sensors 17 and 18 are connected in series by means of the first connection line 19a, second connection line 19b, third connection line 19c and seventh connection line 19g. If both temperature sensors 17 and 18 are functional, the sixth connection line 19f remains currentless in both configurations shown in FIG. 4. If, on the other hand, one of the two temperature sensors 17 or 18 fails, a current flows through the sixth connection line 19f and the temperature can continue to be determined and/or monitored by means of the respectively remaining functional temperature sensor 17 or 18 according to at least the three-wire measurement technique. In the configurations shown, the detection of a failure of one of the two temperature sensors 17 or 18 advantageously follows automatically from the special circuit arrangement.

Figure 5:
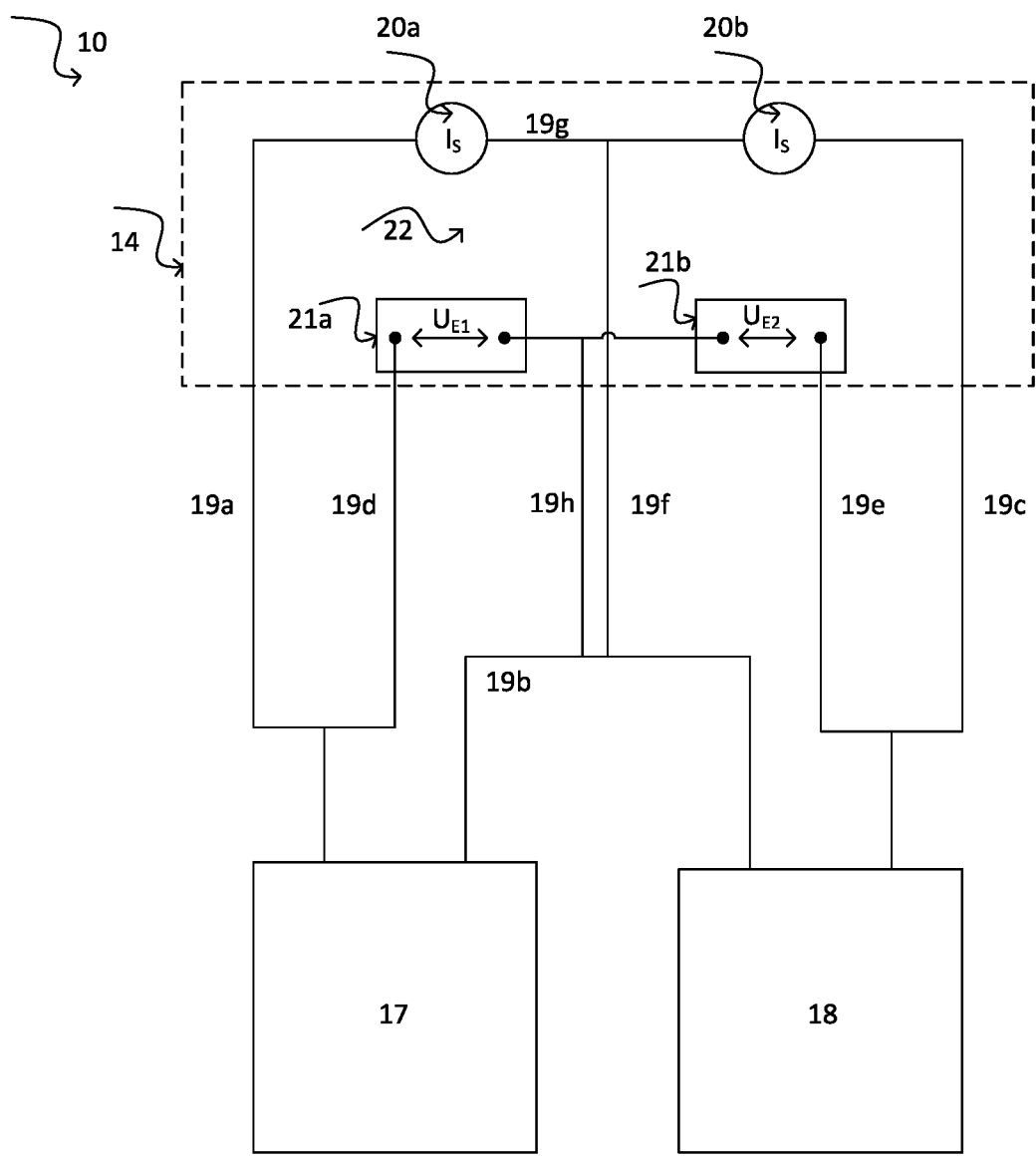
FIG. 5 shows a schematic drawing of the thermometer according to the present disclosure, having six connection lines guided to the electronics.

Another possible embodiment of the present invention is lastly shown in FIG. 5. Here, too, the electronics 14 include two current generation units 20a and 20b and two voltage determination units 21a and 21b. It should be noted that the embodiment in FIG. 5 can also be combined in combination with the previously shown exemplary embodiments in FIGS. 2-4. As in the previous figures, reference characters that have already been explained are not discussed again in detail for FIG. 5.

In addition to the embodiments shown so far, the embodiment in FIG. 5 has an eighth connection line 19h which, like the sixth connection line 19f, runs from the second connection line 19b to the electronics 14. In this embodiment, the first voltage determination unit 21a is designed to tap off the first reception signal $U_{E1}$ between the fourth connection line 19d and the eighth connection line 19h. Similarly, the second voltage determination unit 21b is configured to tap off the second reception signal $U_{E2}$ between the fifth connection line 19e and the eighth connection line 19h.

As in FIG. 4, the sixth connection line 19f remains currentless if both temperature sensors 17 and 18 are fully functional. However, if one of the two temperature sensors 17 or 18 has failed, an electrical current flows along the sixth connection line 19f.

The eighth connection line 19h allows the application of the transmission signal $I_S$ to the temperature sensors 17 and/or 18 and the tapping off of the respective reception signals $U_{E1}$ and/or $U_{E2}$ to be completely separated from one another in respect to the connection wires used in each case. This means, it is advantageously possible to determine and/or monitor the temperature by means of the four-wire measurement technique if both temperature sensors 17 and 18 are functional and if only one of the two temperature sensors 17 or 18 is functional.

The invention claimed is:

1. An apparatus for determining and/or monitoring the temperature, comprising:
    a first temperature sensor;
    a second temperature sensor;
    an electronics, including:
    a first voltage determination unit configured to tap off a first reception signal from the first temperature sensor via fourth and sixth connection lines;
    a second voltage determination unit configured to tap off a second reception signal from the second temperature sensor via fifth and sixth connection lines,
    wherein the electronics is further configured to apply an electrical current to the first temperature sensor and the second temperature sensor;
    a first connection line running from the electronics to a first end of the first temperature sensor;
    a second connection line running from a second end the first temperature sensor to a first end of the second temperature sensor thereby connecting the first temperature sensor in series with the second temperature sensor;
    a third connection line running from a second end of the second temperature sensor to the electronics;
    the fourth connection line running from the first end of the first temperature sensor to the electronics;
    the fifth connection line running from the second end of the second temperature sensor to the electronics; and
    the sixth connection line running from the second connection line to the electronics;
    wherein the electronics further include:
    a single current generation unit for generating the transmission signal; and
    at least one switching element arranged and configured such that via the at least one switching element an electrical connection can be established between the first connection line and the sixth connection line and an electrical connection can be established between the third connection line and the sixth connection line.

2. The apparatus according to claim 1, wherein the electronics further include:
    a first current generation unit; and
    a second current generation unit for generating the transmission signal.

3. The apparatus according to claim 2, further comprising:
    a seventh connection line, wherein the first current generation unit and the second current generation unit are connected in series and connected to each other by the seventh connection line.

4. The apparatus according to claim 3,
    wherein the sixth connection line connects the second connection line and the seventh connection line to each other.

5. The apparatus according to claim 3, further comprising:
    an eighth connection line, wherein the eighth connection line runs from the second connection line to the electronics.

6. The apparatus according to claim 5,
    wherein the first voltage determination unit is configured to tap off the first reception signal between the fourth connection line and the eighth connection line and wherein the second voltage determination unit is configured to tap off the second reception signal between the fifth connection and the eighth connection line.

7. The apparatus according to claim 2,
    wherein the first current generation unit and the first voltage determination unit are arranged in a first electronics unit, and wherein the second current generation unit and the second voltage determination unit are arranged in a second electronics unit.

8. The apparatus according to claim 2,
    wherein the first current generation unit and the second current generation unit and the first voltage determination unit and the second voltage determination unit are arranged together in the same electronics.

9. The apparatus according to claim 1, wherein the electronics is further configured to switch the at least one switching element to connect the first connection line with the sixth connection line thereby shunting the first temperature sensor and to operate the second temperature sensor according to a three-wire measuring technique when the first temperature sensor is shunted, and
    wherein the electronics is further configured to switch the at least one switching element to connect the third connection line with the sixth connection line thereby shunting the second temperature sensor and to operate the first temperature sensor according to a three-wire measuring technique when the second temperature sensor is shunted.

10. The apparatus according to claim 1, wherein the electronics is further configured to test whether the second temperature sensor is defective when the first temperature sensor is shunted, and
    wherein the electronics is further configured to test whether the first temperature sensor is defective when the second temperature sensor is shunted.

* * * * *